No. 682,722. Patented Sept. 17, 1901.
G. LINDENBERG, F. ALTENA & F. FISCHER.
MEAT CUTTER.
(Application filed May 17, 1901.)

(No Model.) 3 Sheets—Sheet 1.

Witnesses:

Inventors.

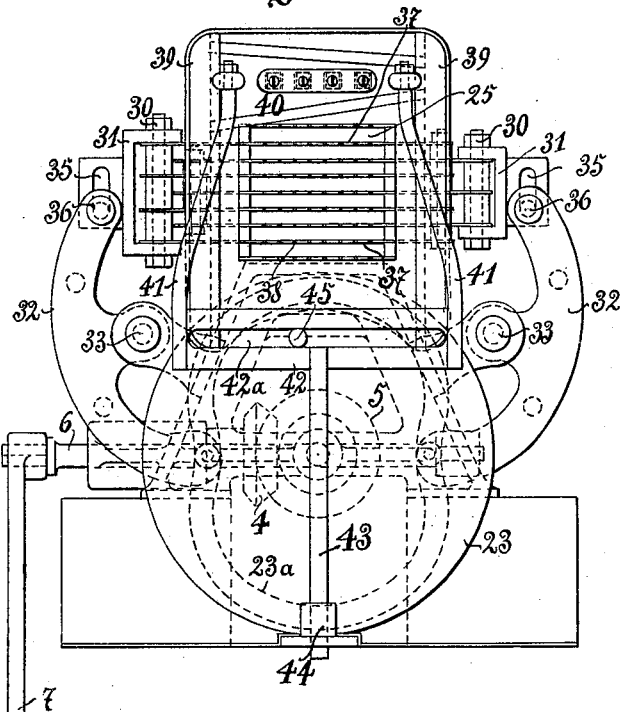
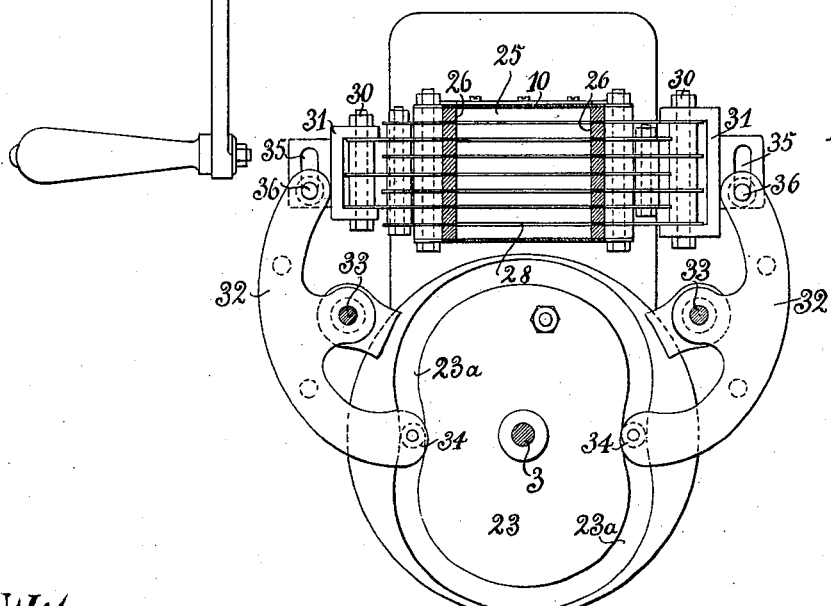

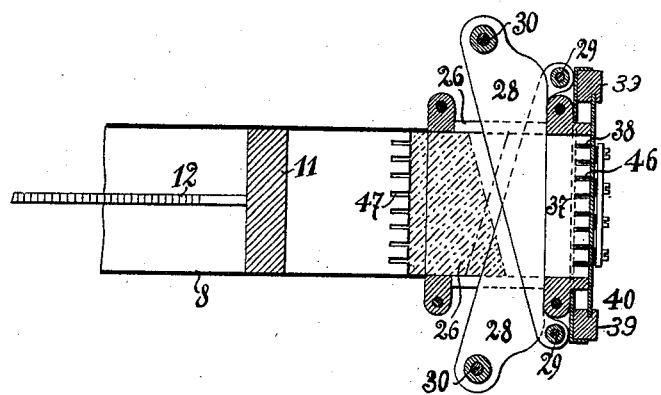
Fig: 5.
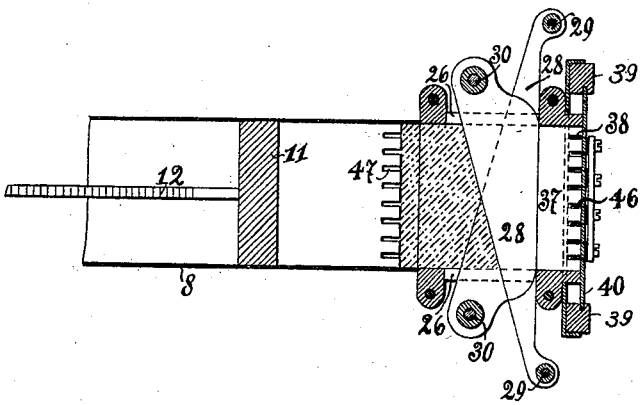
Fig: 6.

UNITED STATES PATENT OFFICE.

GUSTAV LINDENBERG, FRITZ ALTENA, AND FRITZ FISCHER, OF BARMEN, GERMANY.

MEAT-CUTTER.

SPECIFICATION forming part of Letters Patent No. 682,722, dated September 17, 1901.

Application filed May 17, 1901. Serial No. 60,676. (No model.)

*To all whom it may concern:*

Be it known that we, GUSTAV LINDENBERG, FRITZ ALTENA, and FRITZ FISCHER, citizens of the German Empire, residing at Barmen, in the Province of Rhenish Prussia, Kingdom of Prussia, Germany, have invented certain new and useful Improvements in Machines for Cutting Ham and other Suitable Meats; and we do hereby declare the following to be a full, clear, and exact description of the invention, such as will enable others skilled in the art to which it appertains to make and use the same.

This invention relates to improvements in machines for cutting ham and other suitable meat into small cubes, such as are used in sausage-making. Machines for this purpose have been brought out before now; but they all have the drawback that they do not cut clean cubical or prismatical pieces, but squeeze the ham or tear the pieces off from the main piece, and this is mostly due to the fact that the old machines work with a rotary drum in which the cutters are fixed. Now we avoid these drawbacks by arranging the cutting-knives so that they work in a straight line vertically and crosswise or horizontally and that the large pieces of meat are fed toward the knives also in a straight line and intermittently as the cutting of the knives proceeds.

On the accompanying drawings we show the new machine in various views and sections, and we give a description of the same hereinafter.

Figure 1:
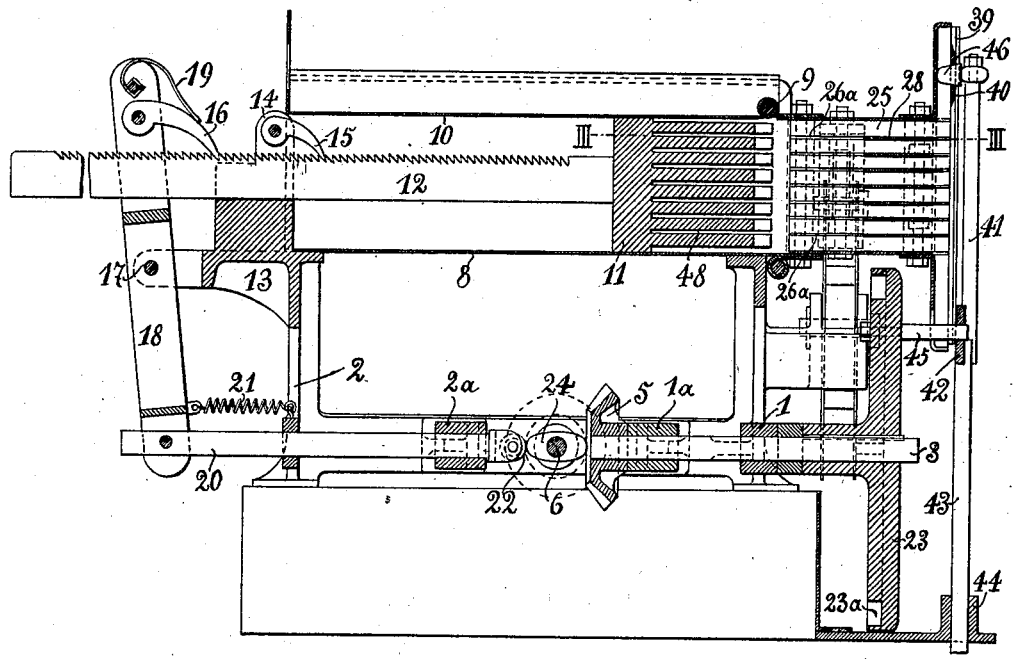
Figure 2:
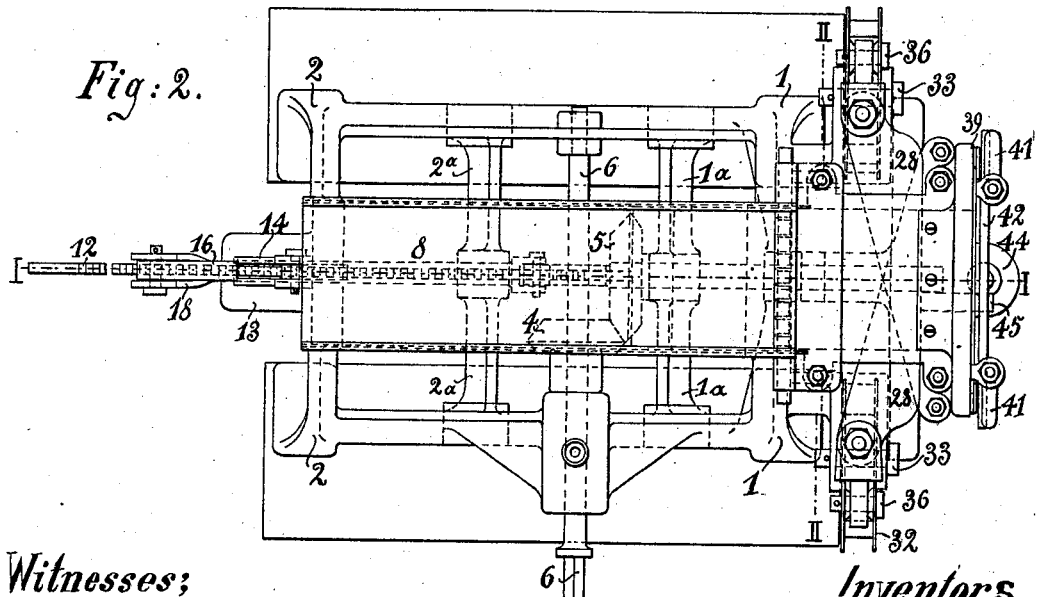

Figure 1 is a longitudinal section along line I I of Fig. 2. Fig. 2 is a view in plan. Fig. 3 is an end view seen from the right side of Fig. 1. Fig. 4 is a vertical section along line II II of Fig. 2 seen toward the right. Fig. 5 is a section along line III III of Fig. 1, showing the horizontal knives in retired position; and Fig. 6 is a similar section showing these knives in the advanced position.

In the new machine, 3 is the main driving-shaft, which is carried in the frames 1 1ª. It is set in motion by a crank 7 on shaft 6 and by means of the miter-wheels 4 5. Upon the standards 1 2 rests the feed-trough 8, which is closed at its upper side by a cover 10, held in hinges 9. A piston 11 is arranged in this trough by which the ham in the trough can be pushed forward. The piston is fixed at the end of a rack 12, guided in a fork 14 at the rear side of a bracket 13. Pawls 15 16 engage with the teeth of the rack. The first one, serving merely to prevent a back thrust of the rack, is fixed at the immovable fork 14, the other one, which is held at the upper end of a rocking lever 18, serving for pushing forward the rack and piston intermittently. It is pressed upon the rack by a spring 19. The lever 18 has its fulcrum on a bolt 17. Its lower end is connected to a rod 20, guided in the brackets 2 2ª, and it is pulled forward by a spiral spring 21, so that the antifriction-roller 22 at its front end is pressed against the cam 24, keyed to the shaft 6. From this it will be seen that the bar 20 is pushed forward and backward by the combined action of the cam 24 and the spring 21, and consequently also the lever 18, and by it the rack 12 and piston 11, is pushed forward by the action of the pawl 16, the pawl 15 hindering the rack to be pulled backward. At the front end of the shaft 3 is fixed a disk 23. The end at the right or front side of the trough forms the knife-box 25. It is of rectangular shape and closed at top and bottom, and its two side walls 26 are provided with horizontal and parallel slits 26ª of such distance from each other which corresponds to the thickness of the cubes of ham to be cut. In these slits are guided the knives 28, by which the ham pushed toward them is cut in horizontal slices. They are guided by the sides 26 of the knife-box, so that they can be moved at right angles to these sides. The cutting edges of the knives run obliquely, as best seen in Figs. 5 and 6, alternately the one in the one direction and the other in the opposite direction. They are held at their ends upon bolts 29 and 30, respectively, distance-pieces keeping them in the prescribed distance from each other, and by the bolts 30 they are at the same time connected to a frame 31 at each side. By means of double-armed curved levers 32 upon bolts 33 the knife-frames 31 are pushed to and fro in the following manner: The upper ends of the levers are connected to the frames 31 by bolts 36 and slots 35, while the lower ends of these levers are provided with friction-rollers 34, which engage with a curved groove 23ᵃ on the disk 23. The groove 23ᵃ is of such shape that during one revolution of the shaft 3 the levers 32 make two motions to and fro, and thus the knives 28 make two cuts during one revolution. During the backward movement of the knives—that is, when they are drawn out of the knife-box—the piston 11 and the meat before it are pushed forward, and it is therefore not pressed between the knives and no squeezing of the meat can take place. In correspondance with this requirement the cam 24, which causes the forward movement of the piston, and the groove 23ᵃ on the disk 23 are so arranged with regard to each other that the forward movement of the meat takes place when the knives have reached nearly their extreme position out of the knife-box, Fig. 5.

A grate formed of plates 37 is arranged in the front end of the knife-box. These plates are of equal thickness with the knives 28, so that the horizontal slices of meat enter into the spaces between these plates, which serve them as supports. At the front end the plates 37 are provided with slits 38, the distance from each other of which is equal to the distance apart of the knives, and before the grate 37 is arranged a frame 39, carrying a knife 40, with a cutting edge at both sides. This knife is carried by bars 41, which are fixed by their lower ends to a transversely-slotted frame 42 on a bar 43, which is guided vertically in a bush 44 at the bottom of the front side of the machine-frame. A pin 45 on the disk 23 engages with the slot 42ᵃ in the frame 42, so that with each revolution of the disk 23 the frame 42 and the knife 40 are moved up and down once, and this up-and-down motion of the knife 40 takes place in such a manner that it is in its uppermost or in its lowest position when the meat in the trough is pushed forward. The knife 40 is provided at its rear side with rectangular vertical blades 46, sharpened at their three free edges and which fit exactly between the slits 38 of the plates 37, so that when the knife 40 is moved up and down these blades cut the horizontal slices in longitudinal strips of square section, which then are cut in cubes by the knife 40 at each stroke upward and downward.

In order to be able to cut all the meat contained in the feed-trough, the piston 11 is provided with horizontal and vertical slots 48 and 47, respectively, in accordance with the knives 28 and 46, so that the piston can be pushed completely forward close against the knife 40 without hindering the movement of the knives 28 and 46.

From the description given and the manner of working of this machine it will be easily understood that the same will cut clean cubes and that no squeezing or tearing of the meat can take place.

What we therefore claim as our invention, and desire to secure by Letters Patent, is—

1. The combination in a ham-cutting machine of a frame 1, 2, 1ᵃ, 2ᵃ with a shaft 3 carried in said frame 1, 1ᵃ, a miter-wheel 4 at one end and a disk 23 at the other end of said shaft, with a crank-shaft 6 carrying a miter-wheel 5 engaging with said wheel 4, a cam 24 on shaft 6, a roller 22 at the end of a bar 20 carried in frame 2, 2ᵃ, said bar being pulled toward the cam 24 by a spiral spring 21, and a lever 18 jointed to the rear end of bar 20 as described and for the purpose set forth.

2. The combination in a ham-cutting machine of a trough 8 with a piston 11 having a rack 12 fixed at its rear side, a pawl 16 engaging with said rack and being held movably on a rocking lever 18, a rod 20 connected with said rocking lever and carrying at its front end an antifriction-roller 22, a spiral spring 21 pulling said rod and the roller at its end against a cam 24 on a shaft 6, so that by the revolution of this shaft the rod 20 is pushed forward and backward the whole as described and for the purpose set forth.

3. In a ham-cutting machine the combination of a trough 8 with a knife-box 25, slits 26ᵃ in the side walls 26 of said knife-box, knives 28 guided in said slits 26ᵃ, knife-frames 31 holding said knives 28 by bolts 30, curved levers 32 fixed by bolts 33 to the machine-frame 2 and engaging by bolts 36 with said frames 31, antifriction-rollers 34 at the lower ends of levers 32, said rollers 34 engaging with a groove 23ᵃ in a disk 23 on shaft 3, the whole as described and for the purpose set forth.

4. In a ham-cutting machine the combination of a trough 8 with a knife-box 25, knives 28 moving horizontally to and fro in said knife-box, a double-edged knife 40, moving up and down in front of the knife-box, vertical cutting-blades 46 fixed to the knife 40, bars 41 holding the knife 40 and fixed to a transversely-slotted frame 42, a pin 45 fixed to the face of disk 23 and engaging with the slot 42ᵃ in frame 42, a guide-rod 43 carrying said frame and a bush 44 for guiding the rod 43, the whole as described and illustrated and for the purpose set forth.

In testimony whereof we have affixed our signatures in presence of two witnesses.

GUSTAV LINDENBERG.
FRITZ ALTENA.
FRITZ FISCHER.

Witnesses:
OTTO KÖNIG,
F. A. RITTERSHAUS.